US005322594A

United States Patent [19]

Bol

[11] Patent Number: 5,322,594

[45] Date of Patent: Jun. 21, 1994

[54] MANUFACTURE OF A ONE PIECE FULL WIDTH INK JET PRINTING BAR

[75] Inventor: Igor I. Bol, Sherman Oaks, Calif.

[73] Assignee: Xerox Corporation, Stamford, Conn.

[21] Appl. No.: 93,915

[22] Filed: Jul. 20, 1993

[51] Int. Cl.[5] .......................... B44C 1/22; C23F 1/00; C03C 15/00

[52] U.S. Cl. .................................... 156/634; 156/628; 156/644; 156/656; 156/657; 156/901

[58] Field of Search ............... 156/628, 633, 634, 644, 156/655, 656, 657, 668, 901, 902; 346/140 R; 427/271

[56] References Cited

U.S. PATENT DOCUMENTS 4,528,070 7/1985 Gamblin ......................... 156/644 X
5,126,768 6/1992 Nozawa et al. ................. 156/644 X

*Primary Examiner*—William Powell

*Attorney, Agent, or Firm*—Nola M. McBain

[57] ABSTRACT

A method of manufacturing a one piece full width ink jet printing bar starting with a glass or ceramic plate with conductive vias, metal interconnects and ink feeds preformed on the plate. Heater filaments are formed from a suitable metal such as tungsten, nickel or tantalum on the plate and insulated from the metal interconnects with silicon nitride. Jet chambers and transport chambers to transport the ink from the ink feeds to the jet chambers are formed using sacrificial material and a structural layer. After the structural layer has been patterned the sacrificial material is removed forming the jet chambers and the transport chambers. Bonding bumps are then formed on the reverse side of the ceramic or glass plate from the jet chambers to provide connections to electronic components which determine which ink jet chambers should fire.

6 Claims, 6 Drawing Sheets

MANUFACTURE OF A ONE PIECE FULL WIDTH INK JET PRINTING BAR

BACKGROUND

This invention relates generally to ink jet printing systems and more particularly concerns the manufacture of a one piece full width ink jet printing bar in which a glass or ceramic substrate is utilized for a cost effective, disposable printing bar.

If current manufacturing techniques were used, they would require assembling a full width printing bar by precision abutting many smaller printing bars until the desired width is achieved. Assembly of many smaller bars into one larger bar is both time consuming and expensive due to the small tolerance requirements of the abutted parts and the precision required in the final part. Typically, assembly costs may account for 50% of the cost of the printing bar. The large unit manufacturing cost of a full width printing bar contributes to the high cost of printers and replacement parts.

If assembly of multiple parts could be reduced or eliminated, not only would the unit manufacturing costs be considerably reduced but the resulting quality and reliability of the finished product would be increased.

Accordingly, it is the primary aim of the invention to provide a method of manufacturing a full width ink jet printing bar which reduces the number of parts needed to manufacture the printing bar.

Further advantages of the invention will become apparent as the following description proceeds.

SUMMARY OF THE INVENTION

Briefly stated and in accordance with the present invention, there is provided a method of manufacturing a one piece full width ink jet printing bar starting with a glass or ceramic plate with conductive vias, metal interconnects and ink feeds preformed on the plate. Heater filaments are formed from a suitable metal such as tungsten, nickel or tantalum on the plate and insulated from the metal interconnects with silicon nitride. Jet chambers and transport chambers to transport the ink from the ink feeds to the jet chambers are formed using sacrificial material and a structural layer. After the structural layer has been patterned the sacrificial material is removed forming the jet chambers and the transport chambers. Bonding bumps are then formed on the reverse side of the ceramic or glass plate from the jet chambers to provide connections to electronic components which determine which ink jet chambers should fire.

While the present invention will be described in connection with a preferred embodiment and method of use, it will be understood that it is not intended to limit the invention to that embodiment or procedure. On the contrary, it is intended to cover all alternatives, modifications and equivalents as may be included within the spirit and scope of the invention as defined by the appended claims.

| Numeric list of elements | |
|---|---|
| plate | 10 |
| conductive vias | 12 |
| ink feeds | 14 |
| electrical input | 15 |
| ground | 16 |
| sacrificial layer | 17 |
| front surface | 18 |
| heater | 19 |
| sacrificial layer | 20 |
| insulator material | 22 |
| sacrificial layer | 24 |
| structural layer | 26 |
| orifices | 28 |
| jet chambers | 30 |
| transport chamber | 32 |
| protective layer | 33 |
| photoresist layer | 34 |
| back surface | 36 |
| conductive connections | 38 |
| sawing lines | 40 |
| bars | 42 |
| cartridge | 50 |
| printed wiring circuit board | 52 |
| pins | 54 |
| board ink feeds | 56 |
| ink resevoir | 58 |

DETAILED DESCRIPTION OF THE INVENTION

Figure 1:
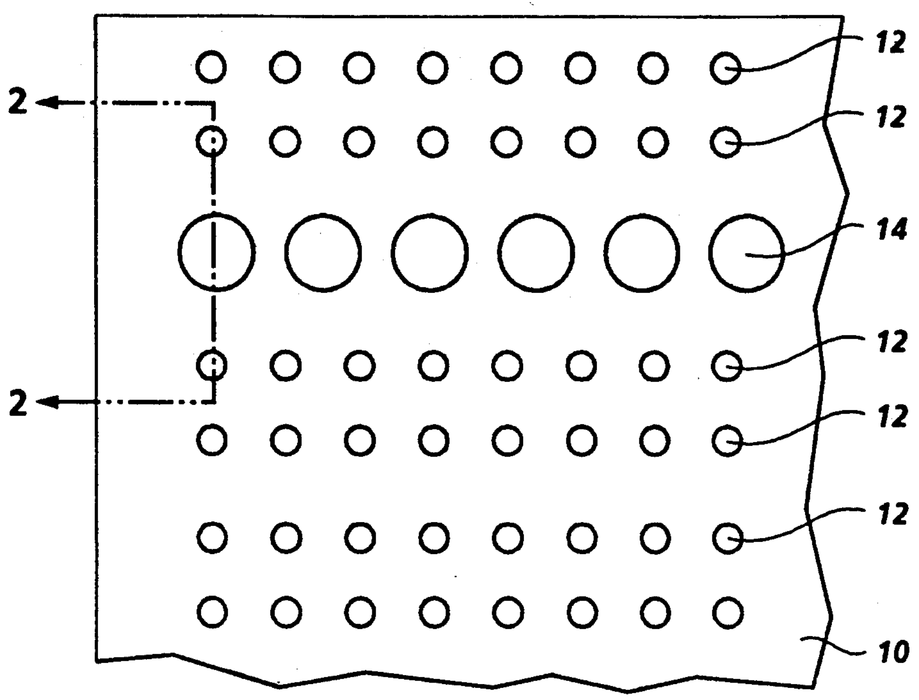
FIG. 1 is a bottom view of a glass or ceramic plate with metal filled through holes.

Turning now to FIG. 1, a glass or ceramic plate 10 is shown with two sizes of through holes filled with metal. The smaller of the holes are approximately 100 $\mu$ in diameter. These smaller holes are filled with metal and are conductive vias 12. The larger of the holes may also be filled with a sacrificial material and will become ink feeds 14. The ink feeds are approximately 200 $\mu$ in diameter and also filled with the same metal as the conductive vias 12. The metal will later be etched to finish forming the ink feeds 14. The plate 10 is approximately 2-5 mm thick and is approximately 225 mm square or an approximately 9 inch square. These values were chosen because they are currently used in multichip module fabrication which uses thick-thin film technology and will yield bars capable of printing and $8\frac{1}{2}$ inch strip necessary for full width printing. Many different sizes are used in multichip module fabrication; however, in order to produce full width print bars one dimension must be at least nine inches. It is understood that as the thick-thin film technology progresses it may be possible to use plates of larger sizes which can either be cut down to the required size or be used to make one piece printing bars capable of printing in larger sizes for graphic arts and other applications.

Figure 2:
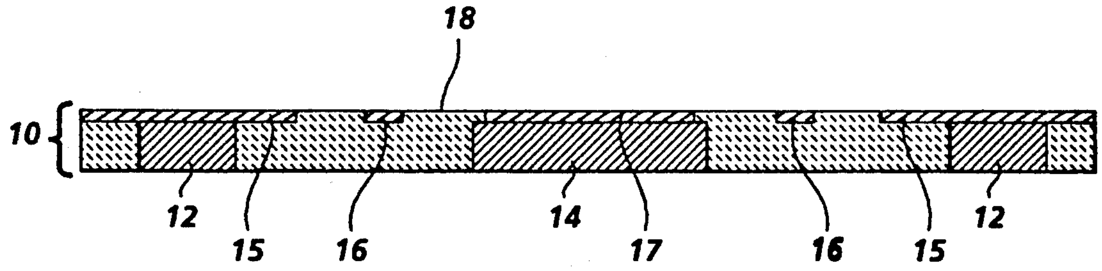
FIG. 2 is a cross section taken through line 2—2 of the plate in FIG. 1.

FIG. 2 shows a cross-section view of the plate 10 shown in FIG. 1 with a single layer of conductive material on a front surface 18. The conductive material is deposited to simultaneously form three different sets of patterns, electrical input 15, ground 16, and sacrificial layer 17 to form sets of circuits. The electrical input 15 is an electrical line that will provide a signal causing an individual jet to fire. Ground 16 is an electrical line that completes the circuit. Sacrificial layer 17 is deposited over the ink feeds 14 which are filled with a sacrificial metal. This portion of conductive material 16 will be removed in a later step. The advantage of depositing sacrificial layer 17 is to continue building up a sacrificial metal layer on the ink feeds 14 which can be removed later in one step. If layers composed of materials other than metal were used to build up the ink feeds 14 then later removal steps would require separate procedures for each different layer. The processing steps used to create the conductive vias 12, ink feeds 14, and the interconnect metal 16 are well known in the art of mulitichip module manufacturing.

The operations required to perform the steps that follow are well known in the art of silicon chip processing, therefore attention will be paid to the order of the steps and the materials used rather than how to perform each individual step.

Figure 3:
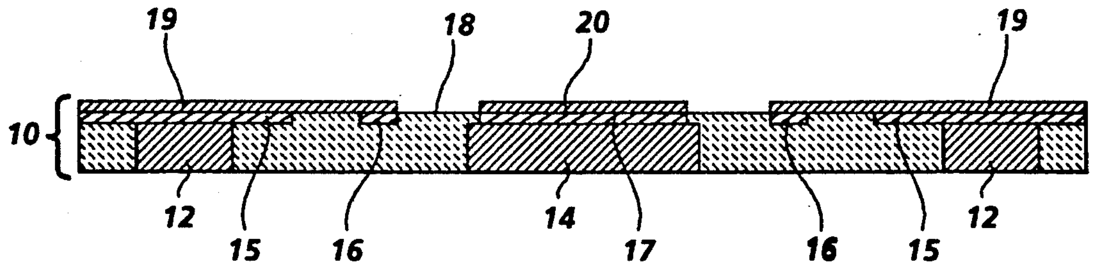
FIG. 3 is a cross section of the plate in FIG. 2 after depositing heater material.

In FIG. 3 the plate 10 has been further processed to deposit and pattern heater material. The heater material can be tungsten, nickel, polysilicon, tantalum, tantalum aluminum or tantalum nitride. The heater material is deposited simultaneously in two patterns, heater 19 and a sacrificial layer 20. The heater 19 overlaps and connects with the interconnect metal 16 by connecting with electrical input 15 and the ground 16. Current will pass from electrical input 15 through the heater 19 and out through ground 16. The heater 19 will be used to heat the ink and thereby to eject the ink. The sacrifical layer 20*a* is deposited on the sacrificial layer 16*a*. Sacrificial layer 20 is deposited over the sacrificial layer 17. This portion of heater material will be removed in a later step.

Figure 4:
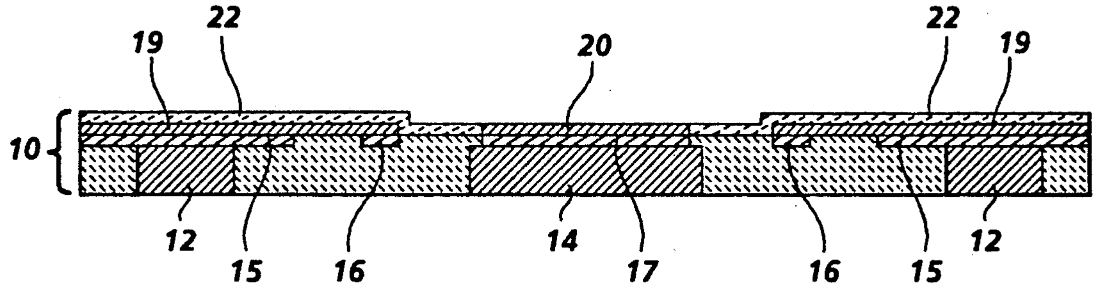
FIG. 4 is a cross section of the plate in FIG. 3 after depositing insulator material.

The ink is electrically conductive and would short the heater material if allowed to flow over the heater material. Therefore, the ink must be electrically isolated from the heater material. As shown in FIG. 4, a layer of silicon nitride is deposited on heater 19 to provide an insulator material 22 between the ink and the heater 19. Jet chambers can now be formed over the electrically isolated heater material. No insulating material is deposited over sacrificial layer 20 by use of conventional masking techniques.

Figure 5:
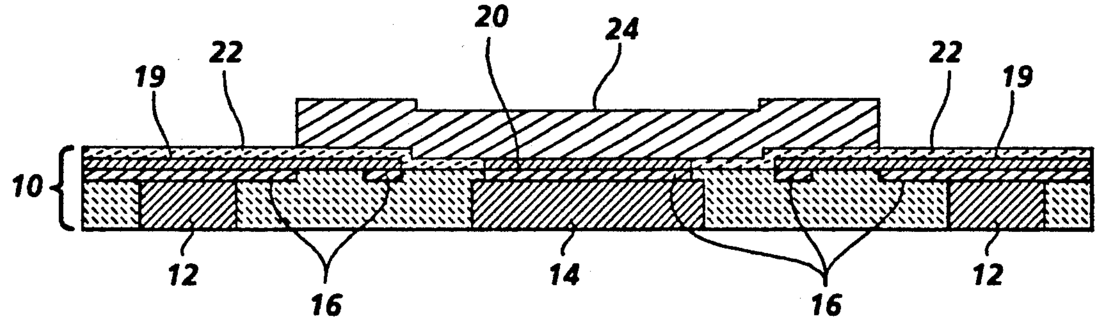
FIG. 5 is a cross section of the plate in FIG. 4 after depositing a sacrificial material.

FIG. 5 illustrates the first step in forming the jet chambers and transport chambers. Sacrificial layer 24 is deposited and patterned to form shapes for jet chambers and transport chambers. A variety of materials can be used for sacrificial layer 24. Although metal is suggested to minimize complexity, since the ink feeds 14 are filled with metal which must be removed, silicon dioxide could also be used. A thickness of 40–70 microns of the sacrificial layer 24 is used.

Figure 6:
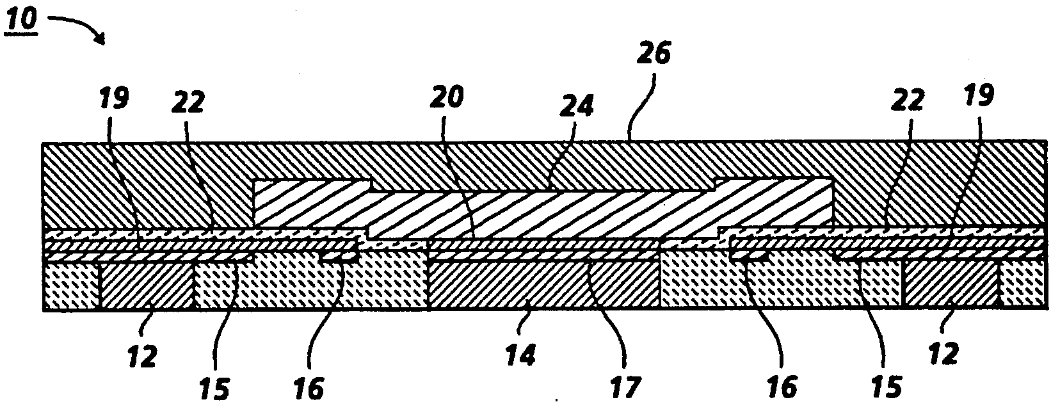
FIG. 6 is a cross section of the plate in FIG. 5 after depositing a structural material.
Figure 7:
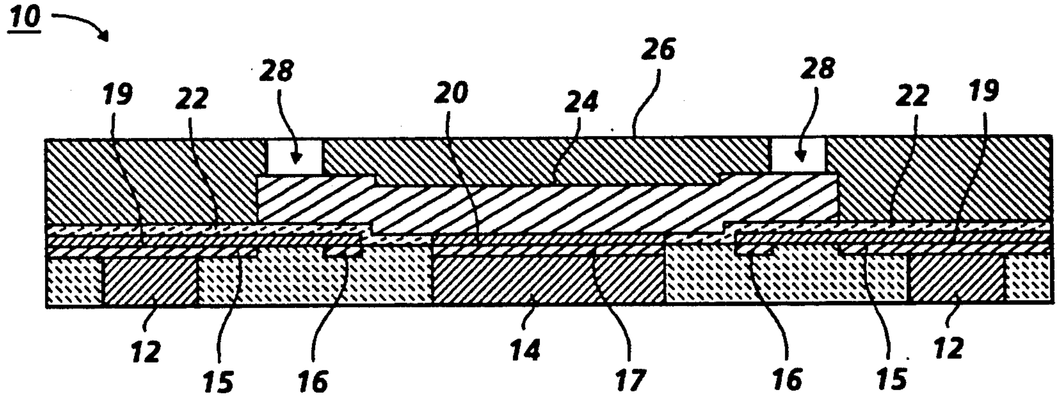
FIG. 7 is a cross section of the plate in FIG. 6 after patterning structural material.
Figure 8:
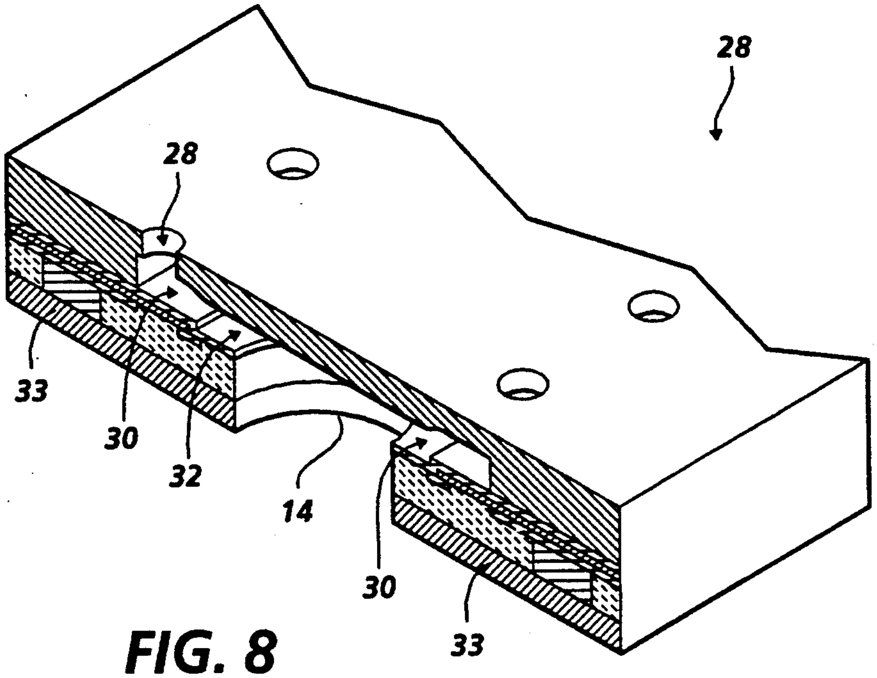
FIG. 8 is a cross section of the plate in FIG. 7 after removing sacrificial material.

A layer of polyimide, PMMA, epoxy or metal for a structural layer 26 is then deposited and used to coat the entire surface. Metal is chosen when the sacrificial layer 26 is an insulator such as silicon dioxide. A thickness of 80–100 microns is used which completely covers the sacrificial layer 24 as shown in FIG. 6. The structural layer 26 is then patterned to form orifices 28 and to gain access to the sacrificial layer 24 as shown in FIG. 7. In FIG. 8, a protective coating 33 for the conductive vias 12 is applied to the back surface 36 while the sacrificial layer 24, sacrificial layer 17 and sacrificial layer 20 are then removed in one etch step forming jet chambers 30, ink feeds 14, and transport chamber 32. After the etching step forming the jet chambers 30, ink feeds 14, and transport chamber 32 the protective layer 33 is removed from the back surface 36.

Figure 9:
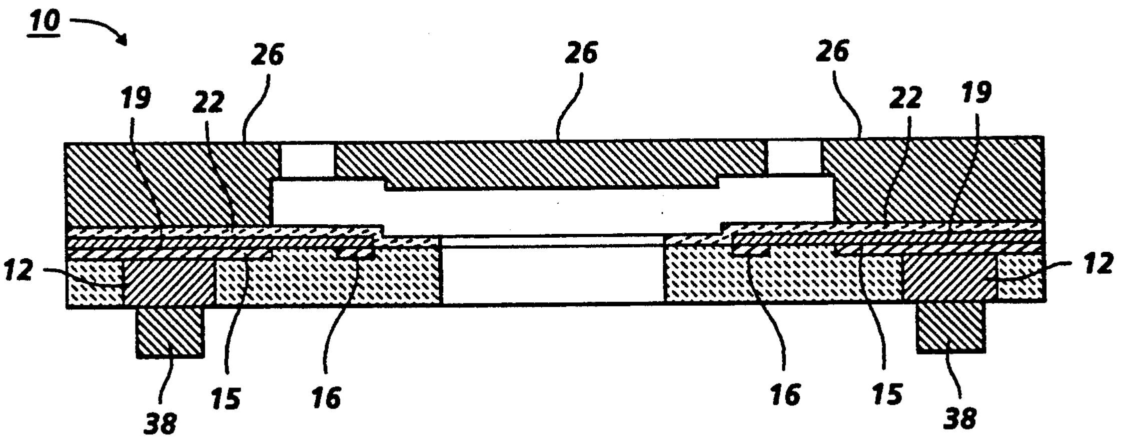
FIG. 9 is a cross section of the plate in FIG. 10 after stripping photoresist material.

Ink flows from the ink feeds 14 through the transport chamber 32 and into the jet chambers 30 where it is heated by the heater 19 and finally expelled from the jet chambers 30 through orifices 28. All processing has been done by building onto the front surface 18 of the plate 10. The plate 10 now contains all of the elements of a print head except for electrical connections to power, ground, and the circuitry required to determine which jet chambers 30 to fire. To make the necessary electrical connections bumps will be plated on the back side of the plate 10 as shown in FIG. 9. The bumps will provide connections suitable for flip-chip bonding to the conductive vias 12. The methods for plating bumps are well known in the art for a variety of processes, any of which may be used in this application. One example is by simple electroless plating.

Figure 10:
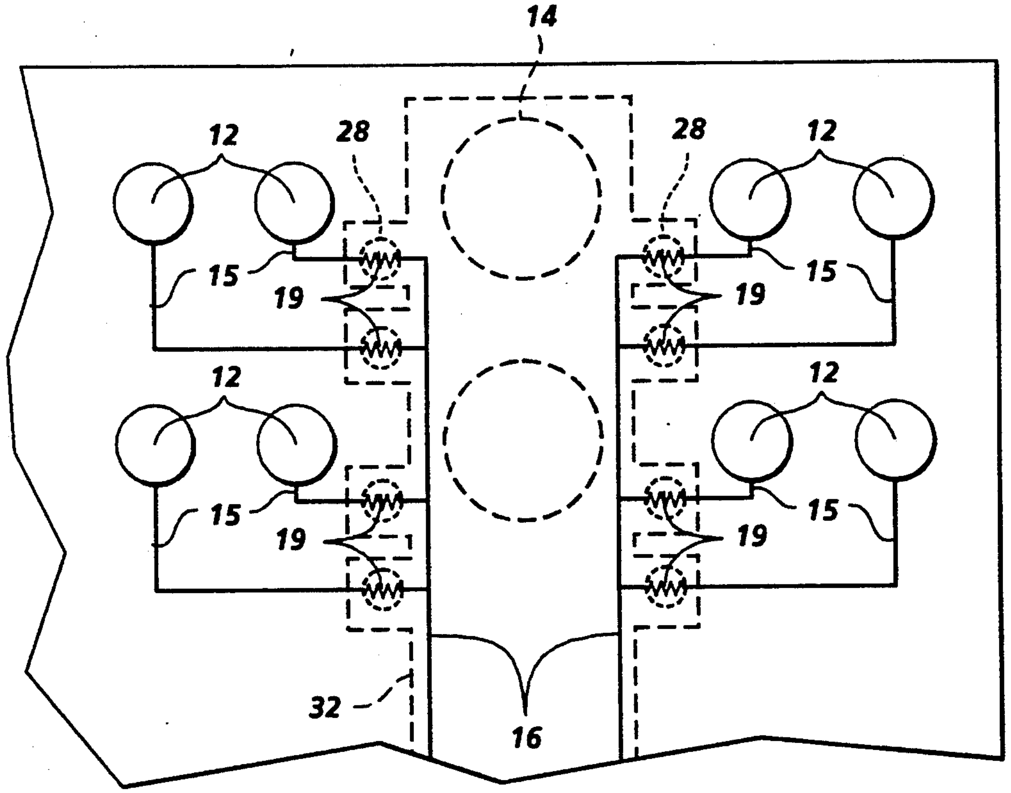
FIG. 10 is a schematic of the device created in the steps shown in FIGS. 2-9.

FIG. 10 illustrates a top view schematic of the assembly on the completed plate 10 showing the electrical interconnections and the relative placement of ink feeds 14, orifices 28, and conductive vias 12. The conductive vias 12 are actually only viewable on the back surface 36 of the plate 10. Electrical connections form the conductive vias 12 are made to the heater 19 through the interconnect metal 16. The heater 19 at the bottom of the jet chambers 30 whose orifices 28 are on the front surface 18 of the processed plate 10. Ink travels from the ink feeds 14 to the jet chambers 30 internally by means of transport chambers 32 which can not be seen in this view.

Figure 11:
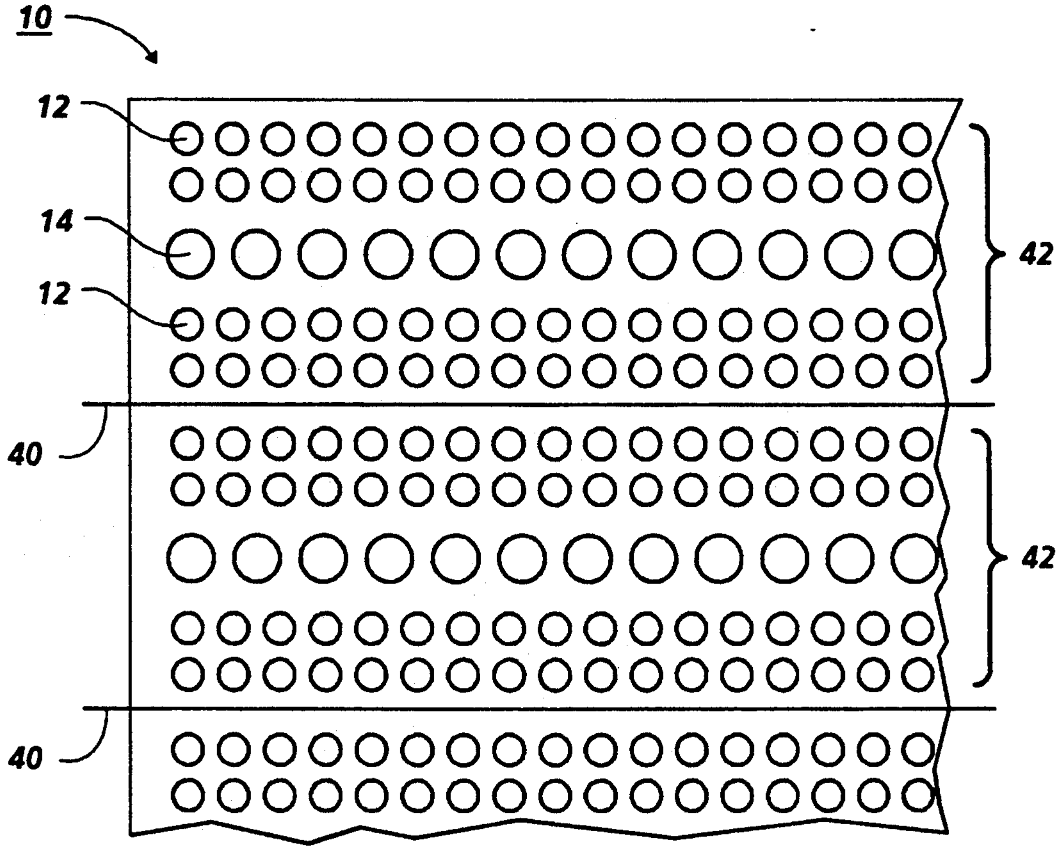
FIG. 11 is a top view of the plate shown in FIG. 1.

FIG. 11 shows a top view of a portion of a plate 10 that has been completely processed with multiple rows of the assembly shown in FIG. 10. Sawing lines 40 are the separation of complete bars from each other. Dividing the plate along sawing lines 34 results in several dozens of complete bars 36 approximately 9 inches wide. Each bar contains a complete ink delivery system when coupled with an ink reservoir to provide ink for the ink feeds 14 and chips bonded to the conductive vias 12 through the conductive connections 38 to control printing.

Figure 12:
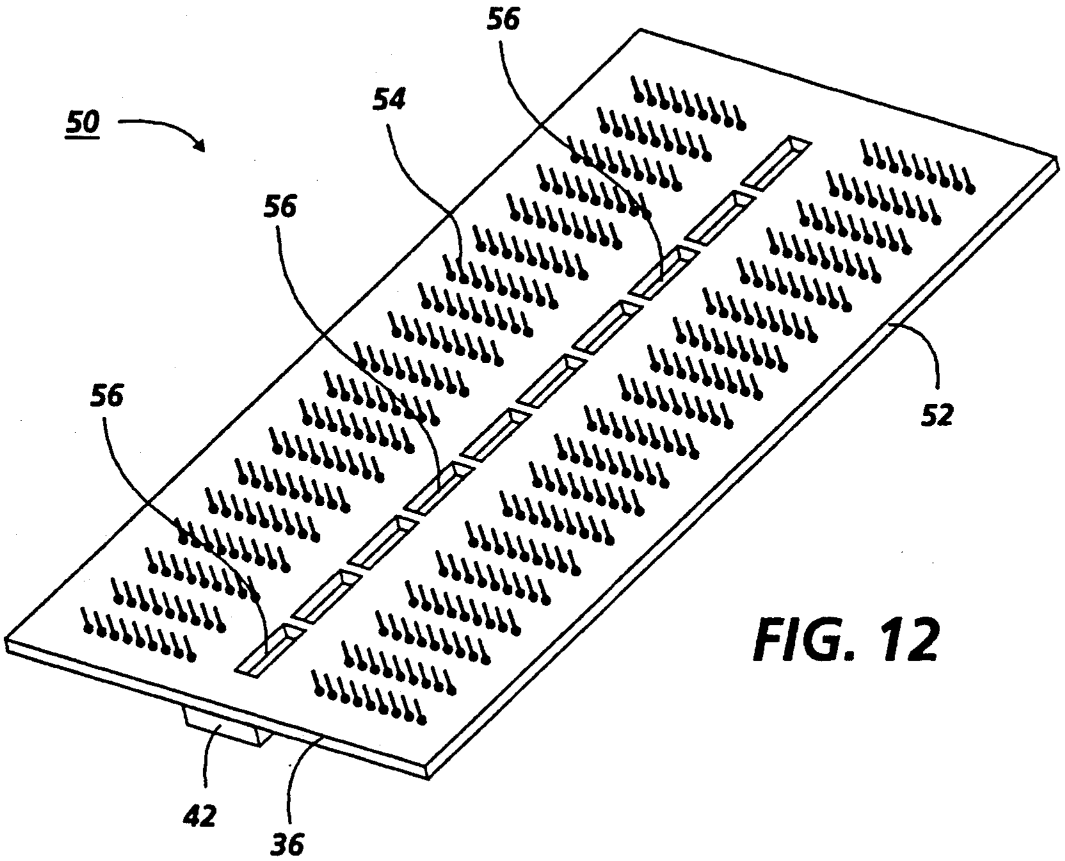
FIG. 12 is a perspective view of a printing cartridge utilizing the device created in FIGS. 2-12.

A printing cartridge 50 can be made by attaching a bar 42 to a printed wiring circuit board 52 as is shown in FIG. 12. This printed wiring circuit board 52 is a fan out board which is used for distributing the electrical connections to the bar 42 over a larger surface area. The printed wiring circuit board 52 has pins 54 on one side of the board for making electrical connections to control logic. The back surface 36 of the bar 42 with the conductive connections 38 can be attached to the printed wiring circuit board 52 in a known number of ways. One relatively simple method of attaching the bar 42 is to use a Z-adhesive. These types of adhesives are ideal since they provide electrical connections as well as an adhesive connection. Z-adhesives will conduct electricity between printed wiring circuit board 52 and bar 42 connections but will electrically isolate neighboring connections from each other and are particularly useful when a large number of connections are needed, as in this application. Another well known technique is flip-chip bonding. In the center of the printed wiring circuit board 52 are a series of board ink feeds 56 for supplying ink to the ink feeds 14 on the bar 42.

Figure 13:
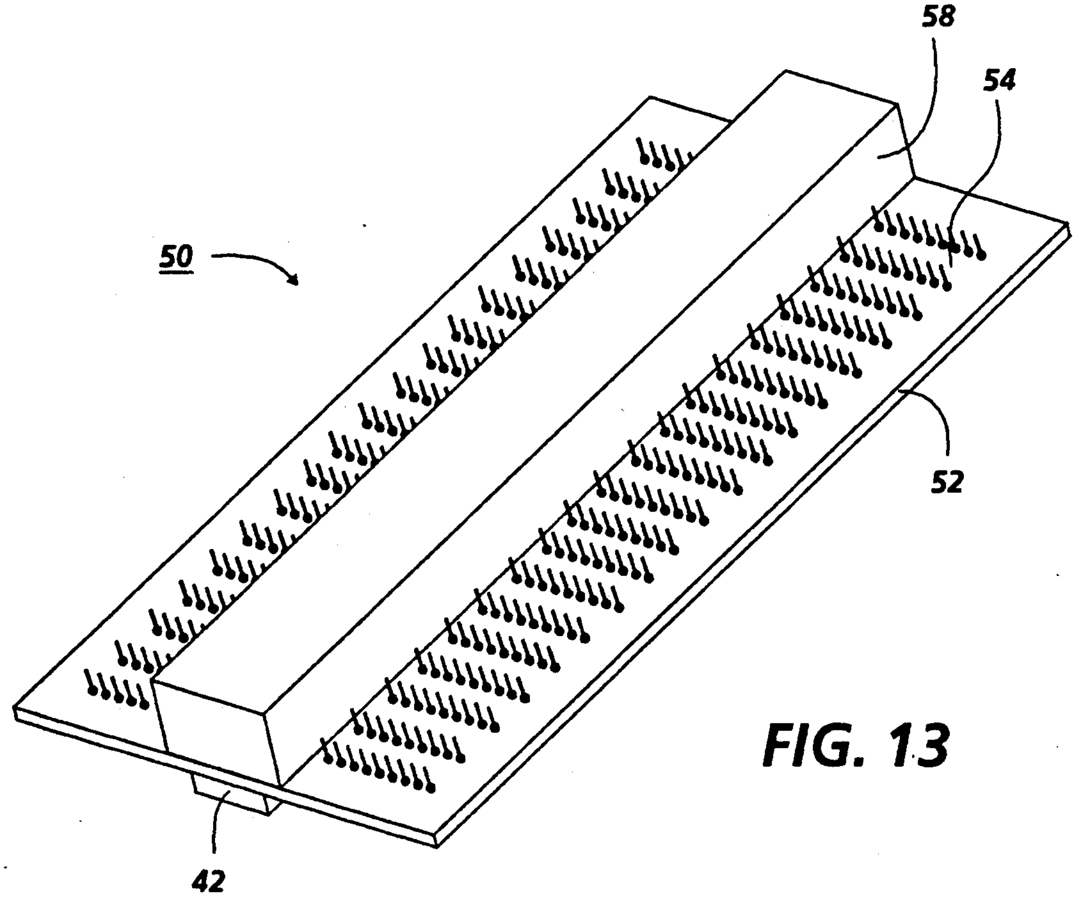
FIG. 13 is a perspective view of a completed printing cartridge utilizing the device created in FIGS. 2-12.

The cartridge 50 is completed when an ink reservoir 58 is attached over the board ink feeds 56 as is shown in FIG. 13. The printing cartridge 50 is now ready to be plugged in for use.

I claim:

1. A method of forming an inkjet printhead comprising the steps of:

a) providing a substrate with conductive vias, conductive interconnects, and ink feeds filled with a first sacrificial material, b) depositing conductive material on at least a portion of said substrate and said conductive interconnects to form heater elements, c) depositing non-conductive material on at least a portion of said heater elements to form insulator elements, d) depositing a second sacrificial material on at least a portion of said insulator elements to define jet chambers and transport chambers, e) depositing a structural layer completely covering said second sacrificial layer, f) patterning said structural layer to form orifices and to expose a portion of said second sacrifical layer, and g) removing said first and second sacrificial layers to form ink feeds, transport chambers and jet chambers.

2. A method of forming an inkjet printhead of claim 1 wherein said heater elements are comprised of tungsten nickel, polysilicon, tantalum nitride, tantalum aluminum, or tantalum.

3. A method of forming an inkjet printhead of claim 1 wherein said first sacrificial material comprises a metal.

4. A method of forming an inkjet printhead of claim 1 wherein said second sacrificial material comprises metal or silicon dioxide.

5. A method of forming an inkjet printhead of claim 1 wherein said structural layer comprises polyimide, PMMA, epoxy or metal.

6. A method of forming an inkjet printhead of claim 1 comprising the additional step of forming conductive connections on said conductive vias.

* * * * *